United States Patent [19]
Rose

[11] 3,971,210
[45] July 27, 1976

[54] START-UP COMPRESSED AIR SYSTEM FOR GAS TURBINE ENGINES

[75] Inventor: Willis Earl Rose, Connersville, Ind.

[73] Assignee: Dresser Industries, Inc., Dallas, Tex.

[22] Filed: Jan. 22, 1975

[21] Appl. No.: 543,092

[52] U.S. Cl............................. 60/39.14; 60/39.74 R
[51] Int. Cl.²......................................... F02C 7/26
[58] Field of Search............. 60/39.14, 39.74, 39.67; 417/2, 62

[56] References Cited
UNITED STATES PATENTS

| | | | |
|---|---|---|---|
| 2,303,381 | 12/1942 | New | 60/39.02 |
| 2,394,253 | 2/1946 | Nettel | 60/39.02 |
| 2,813,231 | 11/1957 | Hyde | 417/2 |
| 2,976,683 | 3/1961 | Flanigan | 60/39.14 |
| 3,072,058 | 1/1963 | Christopher | 417/2 |
| 3,577,965 | 8/1969 | Sundberg | 60/39.74 |
| 3,581,493 | 6/1971 | Sweet | 60/39.74 |
| 3,722,218 | 3/1973 | Lapera | 60/39.14 |

*Primary Examiner*—Carlton R. Croyle
*Assistant Examiner*—Louis J. Casaregola
*Attorney, Agent, or Firm*—R. L. Van Winkle; J. N. Hazelwood

[57] ABSTRACT

The system described herein utilizes a constant speed compressor to augment a service compressor that is an integral part of a gas turbine engine to assure that adequate pressure and volume of air is provided for fuel atomization during start-up of the engine. Further, the system is arranged so that the service compressor automatically assumes the load as its speed increases during the acceleration of the gas turbine engine. The system is designed so that the starting compressor will not be overloaded and can be completely isolated from the circuit if desired.

6 Claims, 2 Drawing Figures

START-UP COMPRESSED AIR SYSTEM FOR GAS TURBINE ENGINES

BACKGROUND OF THE INVENTION

This invention relates generally to air supply systems for gas turbine engines. More particularly, but not by way of limitation, this invention relates to an improved system for supplying compressed air for atomizing fuel in a gas turbine engine during the start-up cycle of the gas turbine engine.

Gas turbine engines are provided with integral service compressors that are driven by the gas turbine for supplying air to atomize the fuel. During start-up, the service compressor is running at such low speeds that the volume and pressure of air is insufficient to properly atomize the fuel. To alleviate this problem, starting compressors that are driven by separate motors at constant speeds have been provided to augment the air supply of the service compressors.

The use of the constant speed starting compressors has proved to be successful in providing the additional volume and pressure required. However, difficulty has been encountered with such systems when the output of the service compressor and the turbine compressor exceeds the capacity of the starting compressor. In an effort to eliminate this overloading problem, elaborate arrangements have been provided that include: sensors responsive to turbine speed to cut off the starting compressor drive motor; sensors arranged to sense either speed or pressure to isolate the starting compressor to prevent the overloads; and, a multiplicity of valves and the like that are manually operated to isolate the starting compressor and to shut down the starting compressor motor drive.

A certain degree of success has been obtained by the types of control systems mentioned hereinbefore. However, they are very complex or require considerable operator attention to be successful.

The object of this invention is to provide a very simple system incorporating a constant speed starting compressor to augment a service compressor during start-up of a gas turbine engine providing an adequate air supply for atomizing the fuel while automatically preventing damage to the starting compressor when the engine attains operating speed.

SUMMARY OF THE INVENTION

This invention provides an improved system for supplying compressed air for providing atomized fuel to the fuel nozzles in gas turbine engines that include a compressor and a combustor. The system comprises: a starting compressor having an inlet and an outlet; a constant speed drive for the starting compressor; and, a service compressor having an inlet, an outlet and arranged to be driven by the engine. A first conduit connects the outlet of the starting compressor in fluid communication with the inlet of the service compressor. A second conduit connects the inlet of the starting compressor in fluid communication with the first conduit. A one-way valve that is located in the second conduit permits flow through the second conduit from the inlet of the starting compressor to the first conduit and prevents flow in the opposite direction. A third conduit connects the outlet of the service compressor to the fuel nozzles whereby the starting compressor provides compressed air to the nozzles during start-up and augments the service compressor until the service compressor reaches operating speed.

DETAILED DESCRIPTION OF THE EMBODIMENT OF FIG. 1

Figure 1:
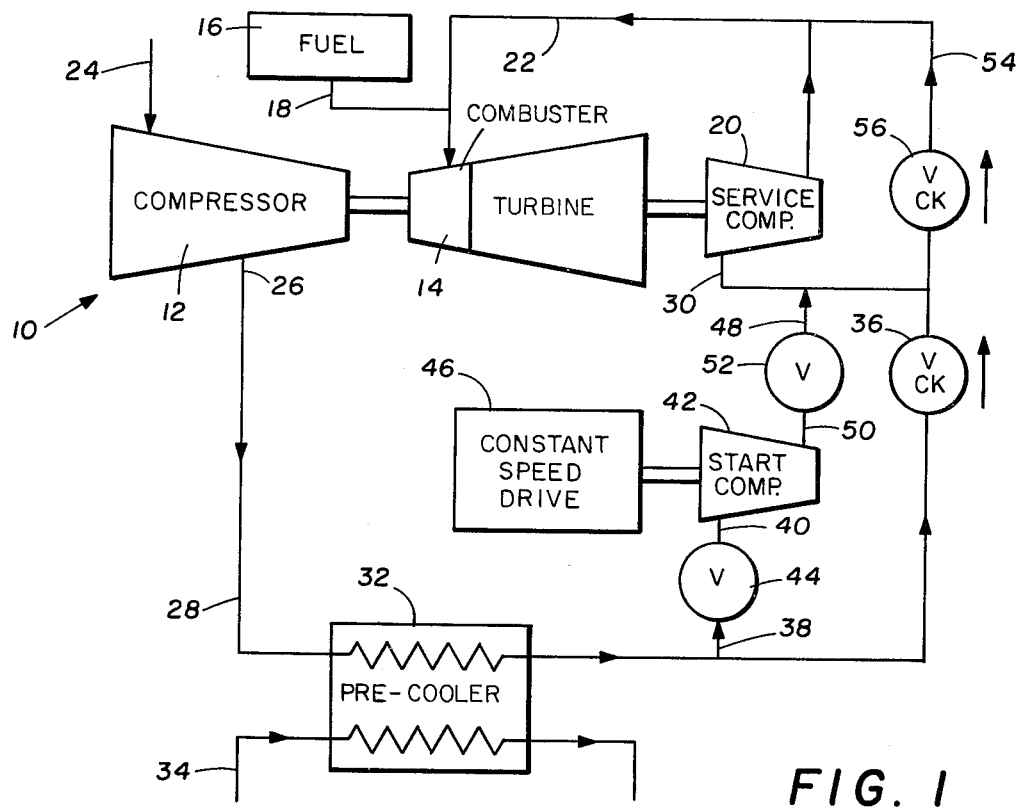
FIG. 1 illustrates one embodiment of a compressed air supply system that is constructed in accordance with the invention.

Referring to the drawing, and FIG. 1 in particular, shown therein is a gas turbine engine that is generally designated by the reference character 10. The gas turbine engine 10 includes a compressor 12 coupled to a combustor 14 that is in fluid communication with a fuel reservoir by means of a conduit 18. The conduit 18 will be connected with conventional fuel nozzles (not shown).

The gas turbine engine 10 also includes a service compressor 20 that is mechanically driven in a conventional manner by the gas turbine engine 10. The outlet of the service compressor 20 is connected to the fuel supply by means of a conduit 22 so that compressed air is provided to atomize the fuel as it enters the combustor 14.

The turbine compressor 12 is provided with a gas inlet 24. An outlet 26 from the compressor 12 is connected by means of a conduit 28 with an inlet 30 of the service compressor 20.

Disposed in the conduit 28 is a heat exchanger 32, which functions as a precooler in this system. The precooler 32 is of conventional construction and may be provided with circulating water through the conduit 34 if desired.

Also disposed in the conduit 28 is a one-way or check valve 36 that permits flow through the conduit 28 toward the service compressor 20, but prevents flow therethrough in the opposite direction. The purpose of the check valve 36 will become more apparent as the following description proceeds.

A conduit 38 has one end connected in fluid communication with the conduit 28 between the check valve 36 and the heat exchanger 32 and its opposite end connected with the inlet 40 of the constant speed starting compressor 42. A valve 44 is disposed in the conduit 38 so that the inlet 40 of the starting compressor 42 can be isolated from the gas flow through the conduit 28.

The starting compressor 42 is driven by a constant speed motor 46 of any conventional type and which will include, although they are not shown, controls for starting and stopping the motor 46.

A conduit 48 connects the outlet 50 of the starting compressor 42 to the conduit 28 between the inlet 30 of the service compressor and the check valve 36. A valve 52 is disposed in the conduit 48 to provide a means of isolating the outlet 50 of the starting compressor 42 from the conduit 28 when desired.

A bypass conduit 54 extends from the conduit 28 between the conduit 48 and the check valve 36 to the conduit 22 on the discharge side of the service compressor 20. A one-way or check valve 56 is located in the conduit 54 permitting fluid flow from the conduit 28 to the conduit 22, but preventing fluid flow in the opposite direction therethrough. The bypass conduit 54 must be utilized in the system when the service compressor 20 is of a type that offers considerable resistance to flow from the starting compressor 42 into the conduit 22 via the service compressor 20. Generally, if the service compressor 20 is of a centrifugal type, for example, it will not be necessary to provide the bypass conduit 54.

During start-up of the gas turbine engine 10, the constant speed drive motor 46 is started to operate the starting compressor 42. With the valves 44 and 52 in the open position, air is drawn into the inlet 40 of the starting compressor 42 through the conduits 28 and 38. Air, at a higher pressure, is discharged through the conduit 48 and valve 52 from the outlet 50 of the starting compressor 42. Depending upon the resistance of flow through the service compressor 20, the gas may flow through the service compressor 20 and conduit 22 to the combustor 14 from the conduit 48 or it may flow via the conduit 54 into the conduit 22 and then into the combustor 14. Of course, the flow will most likely be through both routes depending upon the resistance offered by the various circuits. The check valve 36 prevents the high pressure air from the starting compressor 42 from entering the conduit 28.

As the gas turbine engine 10 gains speed, the service compressor 20 accelerates providing a percentage of compressed air through the conduit 22 to the combustor at the same time that the starting compressor 42 is providing high pressure air to the combustor 14 through the bypass conduit 54. At some point, roughly between 60 and 80 percent the engine running speed, the service compressor 20 begins to provide an additional increase in the pressure of the air passing therethrough. At this point, the starting compressor 42 and the service compressor 20 are operating in series, that is, the starting compressor is boosting the pressure from the conduit 28 and turbine compressor 12 to pressure the inlet 30 of the service compressor 20 which then further compresses the air to provide the air for automization of the fuel in the combustor 14.

It should also be pointed out that the air from the turbine compressor 12 is increasing in pressure in the conduit 28 as engine speed increases and, at some point, roughly between 80 and 100 percent of turbine speed, this pressure will exceed the capacity of the starting compressor 42 and will be sufficient to supply the inlet 30 of the service compressor 20 without the aid of the starting compressor 42. When this occurs, turbine compressor pressure will be imposed on both the inlet 40 and outlet 50 of the starting compressor 42 through the conduits 28, 38 and 48.

At that time, the starting compressor 42 and the constant speed motor 46 can be shut down, but it will be noted that the starting compressor will not be overloaded nor any back pressure applied thereto since the conduit 28 connects directly into the service compressor inlet 30. The high pressure air in the conduit 22 being discharged by the service compressor 20 cannot reach the starting compressor 42 due to the one-way check valve 56. The check valve 56 prevents the high pressure air in the conduits 22 and 54 from entering the conduit 28 when the starting compressor 42 is taken out of the operating sequence.

The following chart illustrates, numerically, typical speeds, pressures, and flow at various locations in the starting system just described.

| Turbine Speed (%) | 20 | 40 | 60 | 80 | 100 |
|---|---|---|---|---|---|
| Starting Compressor 42 | | | | | |
| Speed (RPM) | 2680 | 2680 | 2680 | 2680 | 0 |
| Inlet Pressure (psia) at 40 | 13.14 | 19.26 | 31.5 | 54.6 | 140 |
| Discharge Pressure (psia) at 50 | 18.87 | 27.2 | 43.7 | 67.1 | 140 |
| Inlet Flow (cfm) | 329 | 327 | 328 | 350 | 0 |
| Service Compressor 20 | | | | | |
| Speed (RPM) | 1211 | 2422 | 3634 | 4845 | 6056 |
| Inlet Pressure (psia) at 30 | 18.87 | 27.2 | 43.7 | 67.1 | 140 |
| Discharge Pressure (psia) at 22 | 18.87 | 27.2 | 43.7 | 77.1 | 208 |
| Inlet Flow (cfm) | 7 | 124 | 221 | 311 | 379 |
| Nozzle Pressure Ratio | 1.34 | 1.31 | 1.28 | 1.32 | 1.37 |

After the starting compressor 42 has been stopped, and if desired, the valves 44 and 52 can be closed completely isolating the starting compressor 42 from the air supply system.

From the foregoing, it can be appreciated that the system described is completely automatic, that it compensates for differences in operating speeds of the compressors during startup, that the only manual steps that need be taken are shutting down the constant speed drive and, if desired, closing the valves 44 and 52. Thus, there is presented a very simple start-up system that alleviates the previous difficulties encountered while supplying adequate air of proper pressure and volume to insure complete atomization of the fuel in gas turbine engines.

DETAILED DESCRIPTION OF THE EMBODIMENT OF FIG. 2

Figure 2:
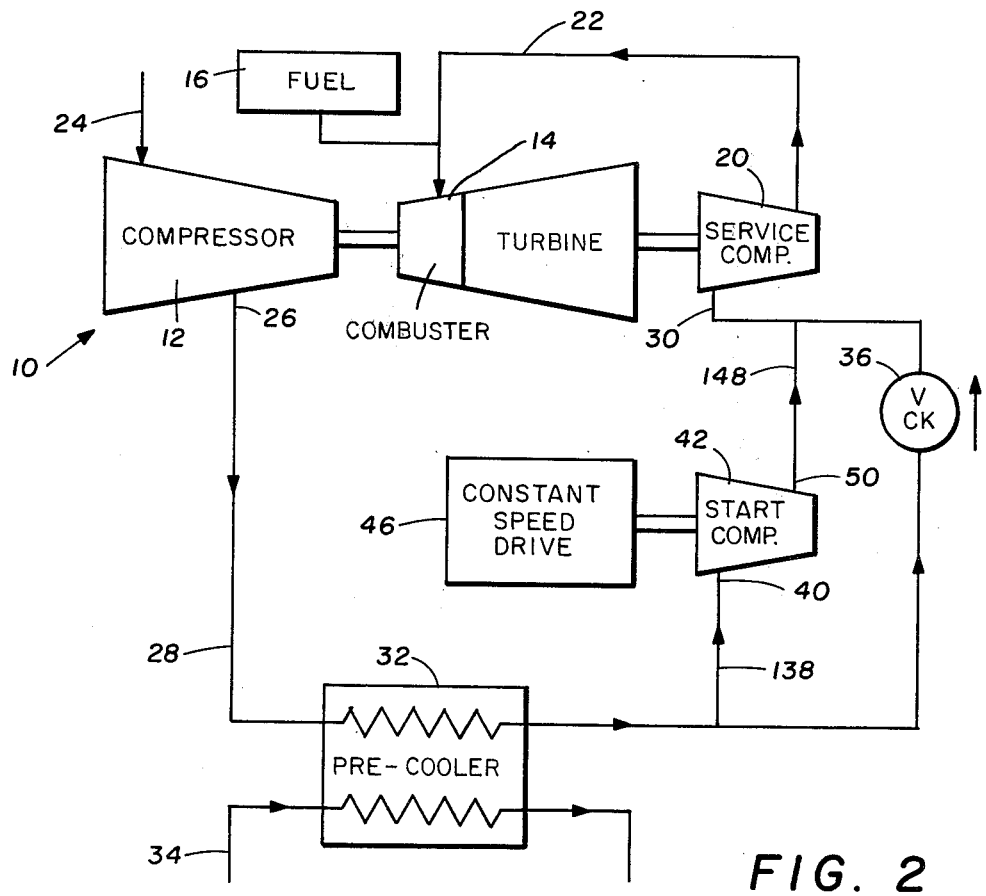
FIG. 2 illustrates another embodiment of a compressed air supply system for gas turbine engines that is also constructed in accordance with the invention.

The embodiment of FIG. 2 is a modification of the embodiment of FIG. 1 and thus, like components in FIG. 2, will be designated by the same reference characters used in the description of FIG. 1.

As shown in FIG. 2, the gas turbine engine 10 also includes the compressor 12, combustor 14, fuel supply 16, and the service compressor 20 as previously described in connection with FIG. 1.

The conduit 28 is connected with the outlet 26 of the turbine compressor 12 and to the inlet 30 of the service compressor 20. Also, as previously described in connection with FIG. 1, the heat exchanger 32 is located in the conduit to provide for reducing the temperature of the pressurized gas leaving the turbine compressor 12. The check valve 36 is located in the conduit 28 and permits flow from the turbine compressor 12 to the service compressor 20, but prevents flow therethrough in the opposite direction.

The starting compressor 42 which is driven by the constant speed motor 46 is connected at its inlet 40 to the conduit 28 by means of a conduit 138. The outlet 50 of the starting compressor 42 is connected with the conduit 28 between the check valve 36 and the inlet 30 of the service compressor 20 by means of a conduit 148. As mentioned in connection with FIG. 1, the outlet of the service compressor 20 is connected to the combustor 14, or more precisely, to the fuel nozzles (not shown) by the conduit 22.

By comparison with FI. 1, it can be seen that the embodiment shown in FIG. 2 is essentially the same, but is simplified in that the conduit 54 bypassing the service compressor, the check valve 56 and the valves 44 and 52 have been eliminated.

The operation of the system illustrated in FIG. 2 is essentially the same as that of the system illustrated in FIG. 1 except that all of the air from the outlet 50 of the starting compressor 42 must pass through the service compressor 20 and the conduit 22 to the combustor 14. Thus, the use of the system described in FIG. 2 will be limited to use with those gas turbine engines 10 having a service compressor that offers little resistance to flow therethrough when the service compressor is operating at very low speed.

It is important to note that the starting compressor 42 in the system of FIG. 2 functions as previously mentioned in connection with the starting compressor 42 of FIG. 1 and is fully protected from overload since the inlet 40 and the outlet 50 of the starting compressor 42 are at the same pressure when the starting compressor 42 is not running or when the pressure in the conduit 28 exceeds the maximum output pressure of the starting compressor 42.

Also, it will be noted that during the start-up sequence when the pressure in the conduit 148 exceeds the pressure in the conduit 28, the check valve 36 functions to prevent such pressure from being applied against either the inlet 40 of the starting compressor or against the outlet 26 of the turbine engine compressor 12. That is to say, all of the pressure and volume output of the starting compressor 42 passes into the compressor 14 to insure complete vaporization of the fuel.

It will be appreciated that the embodiment of FIG. 2 is even more simple than that of the embodiment of FIG. 1 and yet provides the desired features for a start-up system for gas turbine engines.

The embodiments described in detail hereinbefore have been presented by way of example only and it will be understood that many changes and modifications can be made thereto without departing from the spirit or scope of the invention.

The embodiments of an invention in which an exclusive property or privilege is claimed are defined as follows:

1. A system for supplying compressed air providing atomized fuel to the fuel nozzles in gas turbine engines that include a compressor and a combustor, said system comprising:

a starting compressor having an inlet and an outlet;
constant speed drive means for driving said starting compressor;
a service compressor having an inlet and an outlet and arranged to be driven by said engine;
first conduit means connecting the outlet of said starting compressor in fluid communication with the inlet of said service compressor;
second conduit means connecting the inlet of said starting compressor in fluid communication with said first conduit means and with the gas turbine compressor;
one-way valve means located in said second conduit means permitting flow through said second conduit means from the inlet of said starting compressor and from the turbine compressor to said first conduit means and preventing flow in the opposite direction; and,
third conduit means for connecting the outlet of said service compressor to the fuel nozzles, whereby said starting compressor provides compressed air to the nozzles during start-up and augments said service compressor until said service compressor reaches operating speed.

2. The system of claim 1 and also including valve means for isolating said starting compressor after said service compressor has reached operational speed.

3. The system of claim 1 and also including heat exchanger means located in said second conduit means between the gas turbine compressor and the inlet of said starting compressor for reducing the temperature of air flowing from the compressor to said starting compressor.

4. The system of claim 1 and also including:
fourth conduit means connecting said first conduit means and third conduit means in fluid communication; and,
second one-way valve means located in said fourth conduit means permitting flow from said first conduit means to said third conduit means and preventing flow in the opposite direction, whereby air can flow directly from said starting compressor to the fuel nozzles, bypassing said service compressor, in the event air does not flow easily through said service compressor.

5. The system of claim 4 and also including valve means for isolating said starting compressor after said service compressor reaches operational speed.

6. The system of claim 1 and also including heat exchanger means located in said second conduit means between the gas turbine compressor and the inlet of said starting compressor for reducing the temperature of air flowing from the compressor to said starting compressor.

* * * * *